(12) United States Patent
Gmeiner

(10) Patent No.: US 6,345,908 B1
(45) Date of Patent: Feb. 12, 2002

(54) DEVICE FOR MIXING AND DEGASSING A FLOWABLE MASS

(75) Inventor: Paul Gmeiner, Oberwil-Lieli (CH)

(73) Assignee: Micafil AG, Zurich (CH)

(*) Notice: Subject to any disclaimer, the term of this patent is extended or adjusted under 35 U.S.C. 154(b) by 0 days.

(21) Appl. No.: 09/562,097

(22) Filed: May 1, 2000

(30) Foreign Application Priority Data

Apr. 29, 1999 (DE) .......................................... 199 19 521

(51) Int. Cl.⁷ ................................................ B01F 13/06
(52) U.S. Cl. .................... 366/139; 366/147; 366/155.1; 366/305; 366/327.3; 96/214; 96/217; 96/220
(58) Field of Search ........................ 366/64–67, 96–98, 366/102–104, 139, 144, 145, 147, 154.1, 155.1, 168.1, 171.1, 172.1, 172.2, 174.1, 175.1, 285, 286, 302, 314, 325.1, 325.2, 305, 325.92, 326.1, 327.3; 425/203; 96/214, 217, 218, 220; 422/134, 135, 138, 224, 225, 226, 228

(56) References Cited

U.S. PATENT DOCUMENTS

| | | | | |
|---|---|---|---|---|
| 2,908,346 A | * | 10/1959 | Cornell | |
| 2,908,652 A | * | 10/1959 | Forrester | |
| 4,416,672 A | * | 11/1983 | Underwood | |
| 4,465,376 A | * | 8/1984 | Baumgartner | 366/139 |
| 4,469,444 A | * | 9/1984 | Gmeiner et al. | 366/144 |
| 5,152,212 A | * | 10/1992 | Chauveau | 366/139 |
| 5,332,423 A | * | 7/1994 | Gisko et al. | |
| 5,833,363 A | * | 11/1998 | Gmeiner | 96/214 |

FOREIGN PATENT DOCUMENTS

| | | |
|---|---|---|
| DE | 34 05 092 | 8/1984 |
| DE | 196 25 208 | 1/1998 |
| DE | 198 23 232 | 12/1999 |
| EP | 0 155 553 | 9/1985 |
| JP | 09047647 | 2/1997 |

* cited by examiner

Primary Examiner—Charles E. Cooley
(74) Attorney, Agent, or Firm—Burns, Doane, Swecker & Mathis, L.L.P.

(57) ABSTRACT

The device is used to mix and degas a flowable mass (5), in particular a filler-containing casting resin. It is provided with a cylindrically constructed, evacuatable container (1), the container axis (2) of which is oriented essentially vertically. Guided along the container axis (2), it also contains a shaft (12) that holds agitating elements (8, 21). The container (1) is divided into an upper storage container (4) for holding the mass (5) to be degassed, a lower buffer space (19) for holding the degassed mass (20), as well as a pass-through container (6) with a degassing system arranged between storage container (4) and buffer space (19), in which degassing system the mass (5) to be degassed is guided in the form of thin layers. The thin layer degassing system contains at least two conically constructed run-off surfaces (15, 16) offset axially relative to each other. The run-off surfaces are angled in opposing directions. Because of this, the mass (5) to be degassed gravimetrically flows between the shaft (12) and the wall of the container (1) first from the inside to the outside, and then from the outside to the inside. This long flowing path significantly improves the degassing of the mass (5). The stripping elements (17, 18) arranged just above the run-off surfaces (15, 16) and constructed as agitating arms cause the thin layers formed from the mass (5) to be smoothed and mixed, and in this way additionally improve the degassing and mixing of the mass (5).

6 Claims, 1 Drawing Sheet

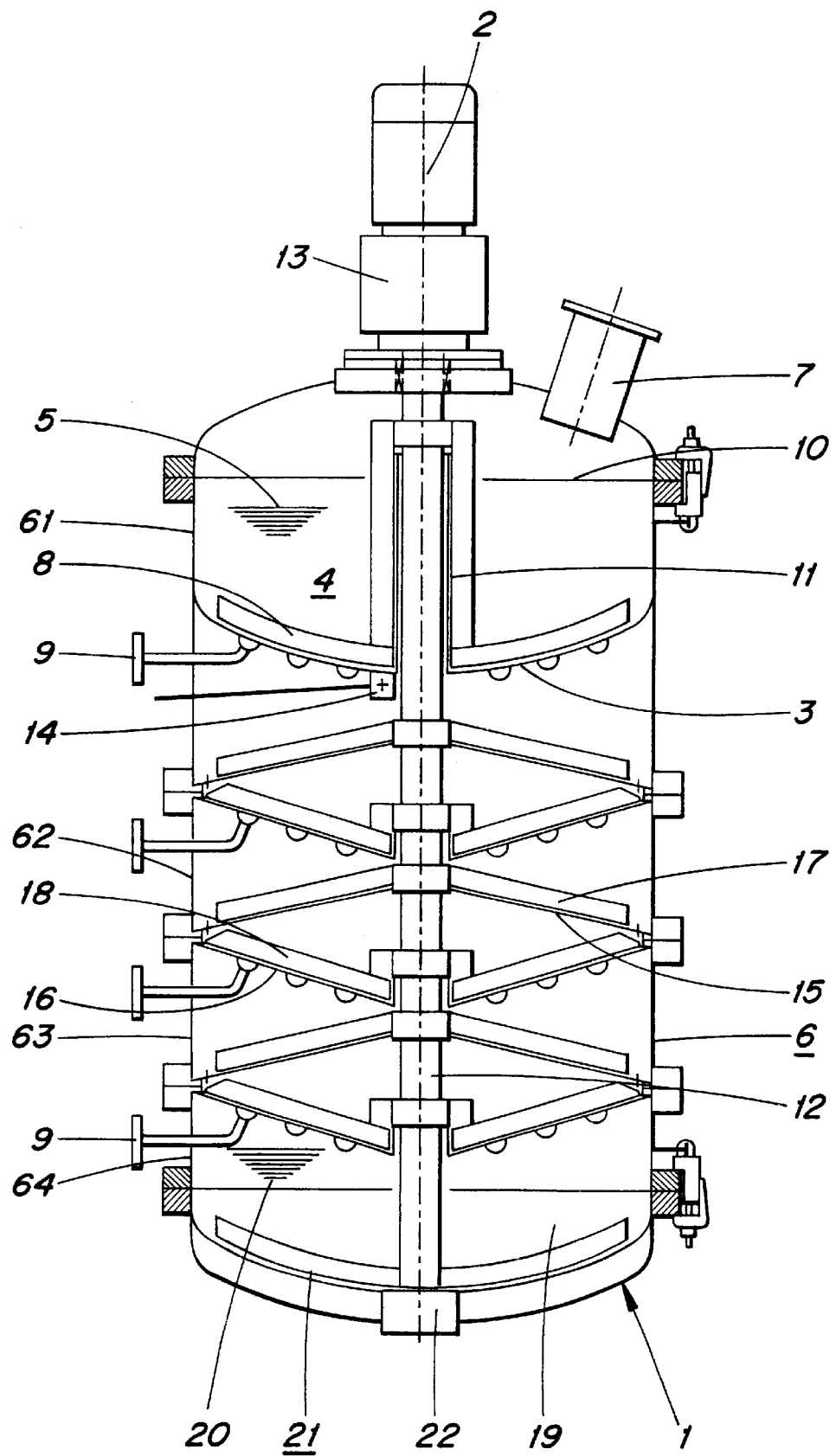

DEVICE FOR MIXING AND DEGASSING A FLOWABLE MASS

FIELD OF THE INVENTION

The invention relates to devices for mixing and degassing a flowable mass, and particularly to devices for degassing a casting resin containing a filler.

BACKGROUND OF THE INVENTION

A mixing and degassing device of the type mentioned has been described in U.S. Pat. No. 5,833,363. This device is provided with a cylindrically constructed, evacuatable container, the container axis of which is oriented essentially in a vertical direction, and a shaft extending along the container axis and having agitation arms and a distribution plate. A flowable, gas-containing mass, for example a filler-containing casting resin, is guided inside this device under the force of gravity and under agitation from a storage space on the top by way of a thin layer degassing system that removes the gas from the flowable mass into a buffer space provided at the bottom of the container, in which buffer space the degassed mass is temporarily stored under agitation. For the degassing, the flowable mass is guided first in the form of thin layers over the rotating distribution plate and is further passed from there via suitably arranged baffle plates and slots to the heating coils of the thin layer degassing system. Since the mass to be degassed flows primarily in a vertical direction and in layers of varying thickness through the degassing system, the degassing may not take place evenly.

SUMMARY OF THE INVENTION

It is an object of this invention to provide a device for producing a degassed mass that is characterized by a high degree of homogeneity. Such a device is used to prepare a castable mass just before the mass is poured into molds inside a casting apparatus. The mass is effectively degassed and mixed inside this device. This eliminates undesirable gas inclusions in the mass to be cast and a demixing of the mass, for example by sedimentation in a filler-containing casting resin.

In the mixing and degassing device according to the invention, the mass to be degassed flows primarily in thin layers, and primarily at a constant speed, from top to bottom through the thin layer degassing system. Because of this, and because the staying time of the mass to be degassed on the thin layer degassing system can be substantially modified by the number and slope of conical run-off surfaces, an extremely homogeneous degassed mass is produced. By deflecting the mass to be degassed at the ends of the conical run-off surfaces, the layers vary in their thicknesses. This results in a natural circulation of the layers and significantly improves the homogeneity of the degassed mass.

It is especially advantageous if the thin layer degassing system is provided with at least one stripping element located just above one of the two run-off surfaces. This stripping element on the one hand produces a mass layer of even thickness. This layer can be degassed quickly and safely, even for highly viscous masses. On the other hand, the stripping element hereby intensively swirls the mass to be degassed by smoothing it and stripping it off and in this way ensures that the components of the mass remain well mixed. Any sedimentation of the mass, even during long staying times in the thin layer degassing system, is avoided in this way. At the same time, as a result of the turbulent mixing, the stripping element, which also acts as an agitating element, ensures quick heating, i.e., a quick heat transfer from the heatable run-off surface to the mass layer. Since practically only thin layers are degassed, it is prevented that during the degassing well degassed and less well degassed masses mix, and in this way an especially advantageous, homogeneous mass is formed for further processing.

BRIEF DESCRIPTION OF THE DRAWINGS

These and other advantages of the invention are explained in more detail below in reference to the drawing which is a side elevational view of a preferred embodiment of the mixing and degassing device according to the invention.

DETAILED DESCRIPTION OF THE INVENTION

The mixing and degassing device shown in FIG. 1 is provided with a cylindrically constructed, evacuatable container 1, the container axis 2 of which is oriented essentially in vertical direction. This container is divided by a dividing wall 3 into a storage container 4 for the flowable mass 5 to be degassed, such as, for example, a mix of two filler-free and filler-containing fluids, for example a reactive, filler-containing casting resin mass, and a pass-through container 6 for processing this mass by degassing and mixing. The mass 5 is brought via an inlet 7 into the storage container 4. With the help of agitation elements 8, each of which is constructed as an arm, the mass brought into the storage container 4 is mixed through and is heated and cooled with the help of a heating and cooling device 9. For this purpose, two, three, or even more heating, or heating and cooling, coils are coaxially arranged with axially spaced apart pipe windings directly below the dividing wall 3. These coils are supplied with energy by a heat generator (not numbered). A pipe section 11 is formed, possibly in a fluid- and/or gas-tight manner, into the dividing wall 3 that acts as the bottom of the storage container 4, said pipe section extending along the container axis 2 into the storage container 4 and ending above the level 10 of the mass 5 to be degassed. The pipe section 11 can be constructed as a bearing of a shaft 12 extending on the container axis 2, said shaft being passed from the outside into the container 1 and driven by a drive 13 located on a cover of the container 1 and in this way being easily accessible. The part of the bottom 3 of the storage container 4 arranged between the wall of the container 1 and the pipe section 11 is constructed so as to deepen from the outside towards the inside and has at a deepest point that adjoins the pipe section 11 a controllable opening 14 for withdrawing mass 5 to be degassed. The agitating elements 8 are attached directly to the shaft 12 and extend close to the bottom 3 and outside wall of the storage container 4, ensuring in this way a good mixing of the flowable mass 5 to be degassed and at the same time preventing its sedimentation.

The section of the container 1 forming the pass-through container 6 is constructed in several parts and contains four hollow-cylindrical container sections 61, 62, 63 and 64 connected with each other by flanges. One of two funnel-shaped metal sheets is respectively attached to two cooperating flanges of two consecutive ones of these container sections, for example, 61 and 62. The two metal sheets are angled in opposite directions and arranged so as to be offset relative to each other axially. Each of them has a conically constructed run-off surface 15 or 16 respectively. Starting from the shaft 12, the run-off surface 15 is tilted conically outward in such a way that the mass to be degassed is guided under the influence of the force of gravity outward to the wall of container 1. Slots (not visible in the drawing) are formed into the outside edge of the associated metal sheet. Before reaching the wall, the mass flowing towards the wall is passed through these slits onto the metal sheet located under it. The run-off surface 16 of this metal sheet is angled in opposite direction to the run-off surface 15, i.e., from outside to inside. The mass supplied through the slits from the metal sheet above is therefore guided on the support surface 16 from the outside to the inside and is guided along the inside edge or via slits formed in the area of the inside edge into the associated metal sheet to the metal sheet below it (not numbered). This metal sheet and three additional metal sheets below it which have not been numbered for reason of clarity are constructed like the two previously described metal sheets.

As shown in the drawing, the dividing wall 3, several of the metal sheets, for example the metal sheet forming the run-off surface 16, can be heated or cooled.

Strip-off elements constructed as individual agitating arms are attached to the shaft 12; for reasons of clarity, only run-off elements 17 or 18 have been numbered. These strip-off elements each -are arranged just above one of the run-off surfaces, for example 15 or 16 respectively.

Below the pass-through container 6 is a buffer space 19 in which the mass 20 that was degassed in the pass-through container 6 is stored. At a free end of the shaft 12 inside the buffer space 19, agitating elements 21 are attached that are constructed as individual arms and extend into the bottom area of the buffer space and ensure a good mixing of the degassed mass 20. A pipe piece 22 extending axially symmetrical from the container 1 is arranged for discharging the degassed and mixed mass 20.

The function of this mixing and degassing device is as follows: Mass 5 cooled in the storage container 4 and possibly cooled is heated with the heating and cooling device 9 to a temperature where it has a relatively low viscosity and flows well. After drive 13 is turned on, the shaft 12, and thus also the agitating elements 8 and 21 and the stripoff elements, for example 17, 18, are rotated around the container axis 2. The agitating elements 8 now homogenize the mass 5 to be degassed. The pipe section 11 conducting the shaft 12 is always located above level 10 of the flowable mass 5 to be degassed. This ensures that the bearing positioning the shaft 12 in the pipe section 11 is removed from contact with the possibly chemically aggressive mass 5.

The flowable mass 5 is passed through the controllable opening 14 into the passthrough container 6. If the same pressure is present both above and below the dividing wall 3, for example an atmospheric pressure or vacuum, the mass is moved by force of gravity. If a vacuum is present in the pass-through container and an atmospheric pressure in the storage container (vacuum-tight bearing), the mass is additionally pressed into the passthrough container 6 as a result of the difference in pressure. The mass 5 exiting the opening 14 impacts the run-off surface 15 not far from the shaft 12. The temperature of the mass, and accordingly also the temperature of the inside of the pass-through container 6, have been adjusted so that the mass 5 flows from the inside to the outside in the form of thin layers over the run-off surface 15. During the run-off to the outside, the layers vary in thickness, which results in a natural circulation of the layers and thus improves the mixing. At the same time, the mass to be degassed is distributed over the entire run-off surface as it flows off. The strip-off element 17 that is rotated by the shaft 12 ensures that on the one hand an evenly thin layer of degassed mass is formed by smoothing, and that on the other hand the swirling of the mass and its shear rate is drastically improved by the stripping-off and the tangential movement. This additionally forces the degassing and, at the same time, the mixing.

As soon as the thin mass layer has reached the outer edge or the slits of the run-off surface 15 located in the area of the outer edge, the mass leaves this run-off surface and flows via the edge or through the slits to the run-off surface 16 below, where it is then guided under the force of gravity from outside to the inside and is smoothed and mixed by the strip-off element 18 as on the metal sheet above it. Since the mass in this way runs successively through all run-off surfaces, an extremely powerful degassing of the mass 5 is achieved with permanent mixing in a tight space.

It is advantageous that the strip-off elements 17, 18 are constructed axially adjustable, since this makes it possible to very conveniently change the spacing between run-off surface and associated stripping element, i.e., set a predetermined layer thickness.

The degassed, homogenized mass 20 is collected in the buffer space 19 and agitated with the agitating elements 21, primarily in the bottom area of the buffer space 19, to effectively prevent it from sedimenting. The mass 20 can be fed via outlet pipe section 22 to a casting apparatus, if needed.

The stripping elements 17, 18 need not all be attached to the shaft 12, and the metal sheets forming the run-off surfaces 15, 16 need not all be attached to the flanges of container sections 61 to 64. It is also possible that the metal sheet forming the run-off surface 16 is attached to the container section 62 forming part of the wall of container 1 or to the shaft 12, and that the stripping element 18 as well as the metal sheet located above it and forming the run-off surface 15 is attached so as to be movable relative to it on the shaft 12 or a flange of the container section 61. It is also possible that all stripping elements 17, 18 are attached to the flanges of the container sections 61 to 64, and all metal sheets are attached to the shaft 12.

What is claimed is:

1. A device for mixing and degassing a flowable mass, comprising: a cylindrically constructed, evacuatable container, the container axis of which is oriented substantially in a vertical direction, and a shaft extending along the container axis and having agitation elements, wherein the container is provided with an upper container portion for storing the mass to be degassed and a lower container portion for buffering the degassed mass, a pass-through container portion arranged between the upper storage container portion and the lower container portion, the pass through container portion layer including degassing elements, the degassing elements including at least two conically constructed run-off surfaces offset relative to each other axially and which are arranged in such a way at opposite angles to each other whereby the mass to be degassed flows between the shaft and the container wall by gravity first from the inside to the outside and then from the outside to the inside, or first from the outside to the inside and then from the inside to the outside.

2. The device as claimed in claim 1, wherein the degassing elements include at least one stripping element located just above a first of the two run-off surfaces and constructed as an agitating arm.

3. The device as claimed in claim 2, wherein the stripping element is attached at the shaft and that two metal sheets forming both of the run-off surfaces are attached at the wall of the container.

4. The device as claimed in claim 1 wherein at least one of the run-off surfaces is at least partially heatable and/or coolable.

5. The device as claimed in claim 1 wherein the container is constructed in several parts and is provided with at least two hollow-cylindrical container sections connected to each other by means of flanges, and that one each of the two run-off surfaces is attached to the two cooperating flanges of these two container sections.

6. The device as claimed in claim 1, wherein the flowable mass is a filler-containing casting resin.

* * * * *